(12) United States Patent
Lemmens et al.

(10) Patent No.: US 6,364,075 B1
(45) Date of Patent: Apr. 2, 2002

(54) FREQUENCY DEPENDENT DAMPER

(75) Inventors: Luc Lemmens, Genk; Stefaan Duym, Oudergem, both of (BE)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/703,012

(22) Filed: Oct. 31, 2000

Related U.S. Application Data

(63) Continuation-in-part of application No. 09/159,722, filed on Sep. 24, 1998, now Pat. No. 6,148,969.

(51) Int. Cl.[7] .................................................. F16F 9/00
(52) U.S. Cl. ............................. 188/322.22; 188/322.15; 188/282.5; 188/282.1; 188/317
(58) Field of Search ....................... 188/322.22, 322.16, 188/322.17, 322.15, 322.13, 282.1–282.8, 317, 269, 282.6, 287; 267/64.11, 64.28

(56) References Cited

U.S. PATENT DOCUMENTS

| | | | |
|---|---|---|---|
| 4,326,733 A | 4/1982 | Rubalcava | |
| 4,443,926 A | 4/1984 | Pearson | |
| 4,934,667 A | 6/1990 | Pees | |
| 4,948,104 A | * 8/1990 | Wirges | 267/64.11 |
| 5,052,278 A | 10/1991 | Smillie | |
| 5,139,119 A | * 8/1992 | Karnopp | 188/282.2 X |
| 5,307,907 A | * 5/1994 | Nakamura et al. | 188/282.1 |
| 5,328,196 A | 7/1994 | Ohma | |
| 5,360,089 A | * 11/1994 | Nakamura et al. | 188/266.4 |
| 5,374,077 A | 12/1994 | Penzotti et al. | |
| 5,497,862 A | * 3/1996 | Hoya | 188/282.5 |
| 5,697,477 A | 12/1997 | Hiramoto | |

* cited by examiner

Primary Examiner—Robert J. Oberleitner
Assistant Examiner—Melanie Torres
(74) Attorney, Agent, or Firm—Harness, Dickey & Pierce, PLC

(57) ABSTRACT

A gas shock absorber has a pressure tube which defines a working chamber. A piston divides the working chamber into an upper working chamber and a lower working chamber. A series of extension passages extend through the piston and are opened and closed by an extension valve assembly. A first and a second series of compression passages extend through the piston and are opened and closed by a first and a second compression valve assembly, respectively. A rod guide assembly is located between the pressure tube and a piston rod. The rod guide assembly includes an oil chamber for sealing and lubricating the piston rod.

10 Claims, 6 Drawing Sheets

FREQUENCY DEPENDENT DAMPER

This application is a continuation in part of U.S. application Ser. No. 09/159,722, filed Sep. 24, 1998, now U.S. Pat. No. 6,148,969.

FIELD OF THE INVENTION

The present invention relates generally to dampers or shock absorbers adapted for use in a suspension system such as the suspension system used for automotive vehicles. More particularly, the present invention relates to a shock absorber which utilizes a gas rather than hydraulic fluid as the damping medium.

BACKGROUND OF THE INVENTION

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to the sprung portion of the vehicle through a piston rod which extends through the pressure tube. The piston divides the pressure tube into an upper working chamber and a lower working chamber both of which are typically filled with a hydraulic liquid. Because the piston is able, through valving, to limit the flow of the hydraulic liquid between the upper and the lower working chambers when the shock absorber is compressed or extended, the shock absorber is able to produce a damping force which counteracts the vibration which would otherwise be transmitted from the unsprung portion of the vehicle to the sprung portion of the vehicle. In a dual tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the vehicle.

Shock absorbers filled with hydraulic liquid have met with continuous success throughout the automotive industry. While meeting with success in the automotive industry, hydraulic liquid filled shock absorbers are not without their problems. One problem with these prior art hydraulic shock absorbers is to make them sensitive to the frequency of the vibrations. Complex systems have been developed to produce hydraulic liquid filled shock absorbers which are relatively soft for high frequency vibrations while being relatively stiff for low frequency vibrations. Other problems associated with the prior art hydraulic liquid filled shock absorbers include the variability in their damping forces due to the temperature changes of the hydraulic liquid. As the temperature of the hydraulic liquid changes, the viscosity of the hydraulic liquid also changes which significantly affects the damping force characteristics of the liquid. In addition, any aeration of the hydraulic liquid during operation adversely affects the operation of the damper due to the introduction of a compressible gas into a non-compressible hydraulic liquid. Finally, the hydraulic liquid adds to the weight of the shock absorber as well as presenting environmental concerns regarding the use of a hydraulic liquid.

The continued development of shock absorbers has been directed towards shock absorbers which do not utilize a hydraulic liquid for their damping medium. The replacement of the hydraulic liquid medium with an environmental friendly gas medium provides the opportunity to overcome some of the problems associated with the hydraulic fluid medium shock absorbers.

SUMMARY OF THE INVENTION

The present invention provides the art with a shock absorber which utilizes air as the damping medium. The use of air as the damping medium produces a frequency dependent damper or shock absorber which is less sensitive to temperature when compared with hydraulic damping, is not adversely affected by aeration over time, is lower in weight and is environmental friendly due to the elimination of the hydraulic oil.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a side view, partially in cross-section, of a unique gas filled frequency dependent damper in accordance with another embodiment of the present invention;

DETAILED DESCRIPTION OF THE PREFERRED EMBODIMENT

Figure 1:
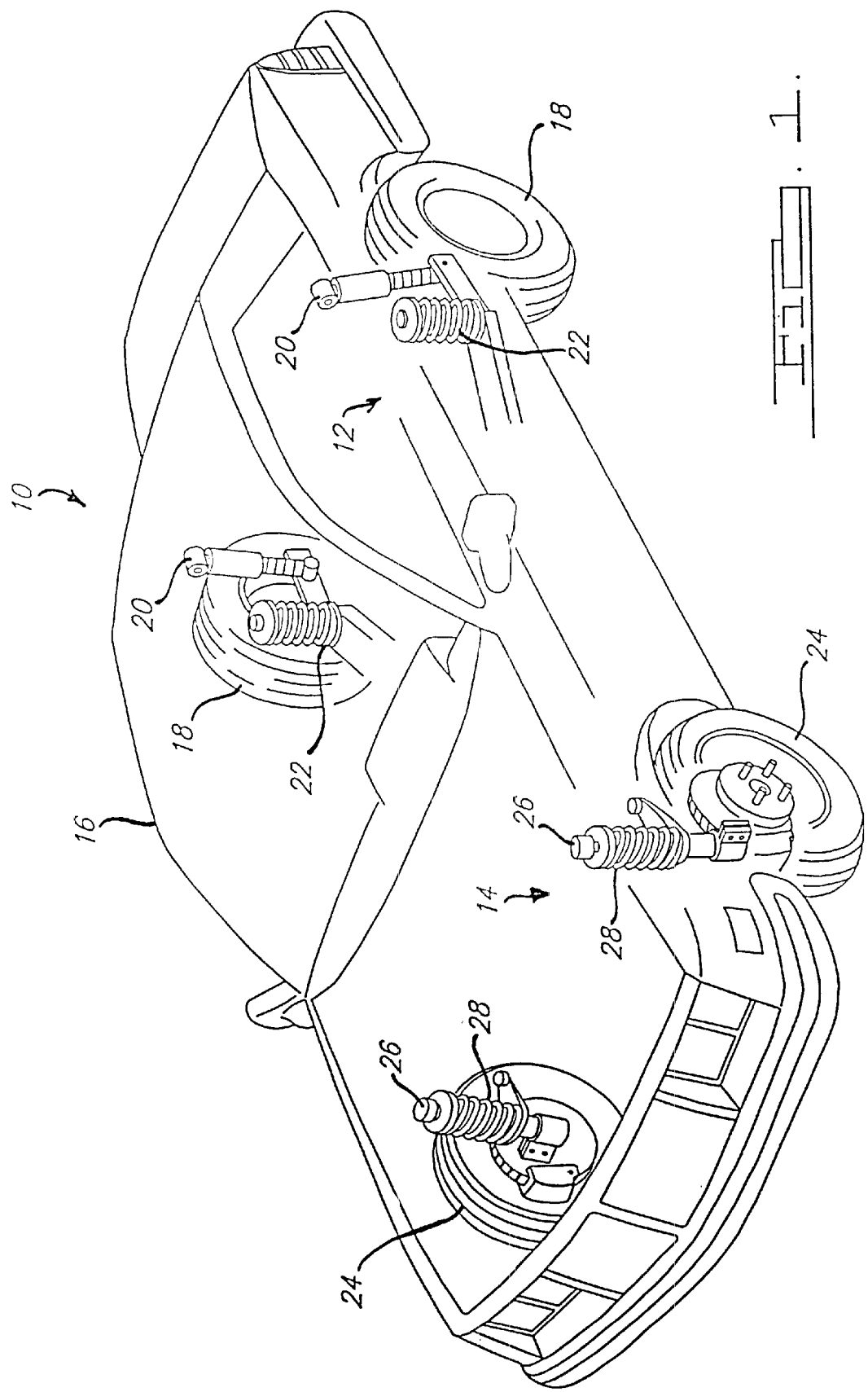
FIG. 1 is an illustration of an automobile incorporating the unique gas filled frequency dependant damper in accordance with the present invention.

Referring now to the drawings in which like reference numerals designate like or corresponding parts throughout the several views, there is shown in FIG. 1 a vehicle incorporating a suspension system having the frequency dependant dampers in accordance with the present invention which is designated generally by the reference numeral 10. Vehicle 10 includes a rear suspension system 12, a front suspension system 14 and a body 16. Rear suspension system 12 includes a pair of independent suspensions adapted to operatively support a pair of rear wheels 18. Each rear independent suspension is attached to body 16 by means of a shock absorber 20 and a helical coil spring 22. Similarly, front suspension 14 includes a pair of independent suspensions adapted to operatively support a pair of front wheels 24. Each independent front suspension is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12 and 14 respectively) with respect to the sprung portion (i.e., body 16) of vehicle 10. While vehicle 10 has been depicted as a passenger vehicle having independent front and rear suspensions, shock absorbers 20 and 26 may be used with other types of vehicles having other types of suspensions and springs or in other types of applications including, but not limited to, vehicles incorporating air springs, leaf spring, non-independent front and/or non-independent rear suspension systems. One of the unique features of the present invention is that if it is combined with an air spring, the air spring and the shock absorber can be separate units. There is no need to provide communication between the air spring and the shock absorber. Further, the term "shock absorber" as used herein is meant to refer to dampers in general and thus will include MacPherson struts, spring seat units as well as other shock absorber designs know in the art.

Figure 2:
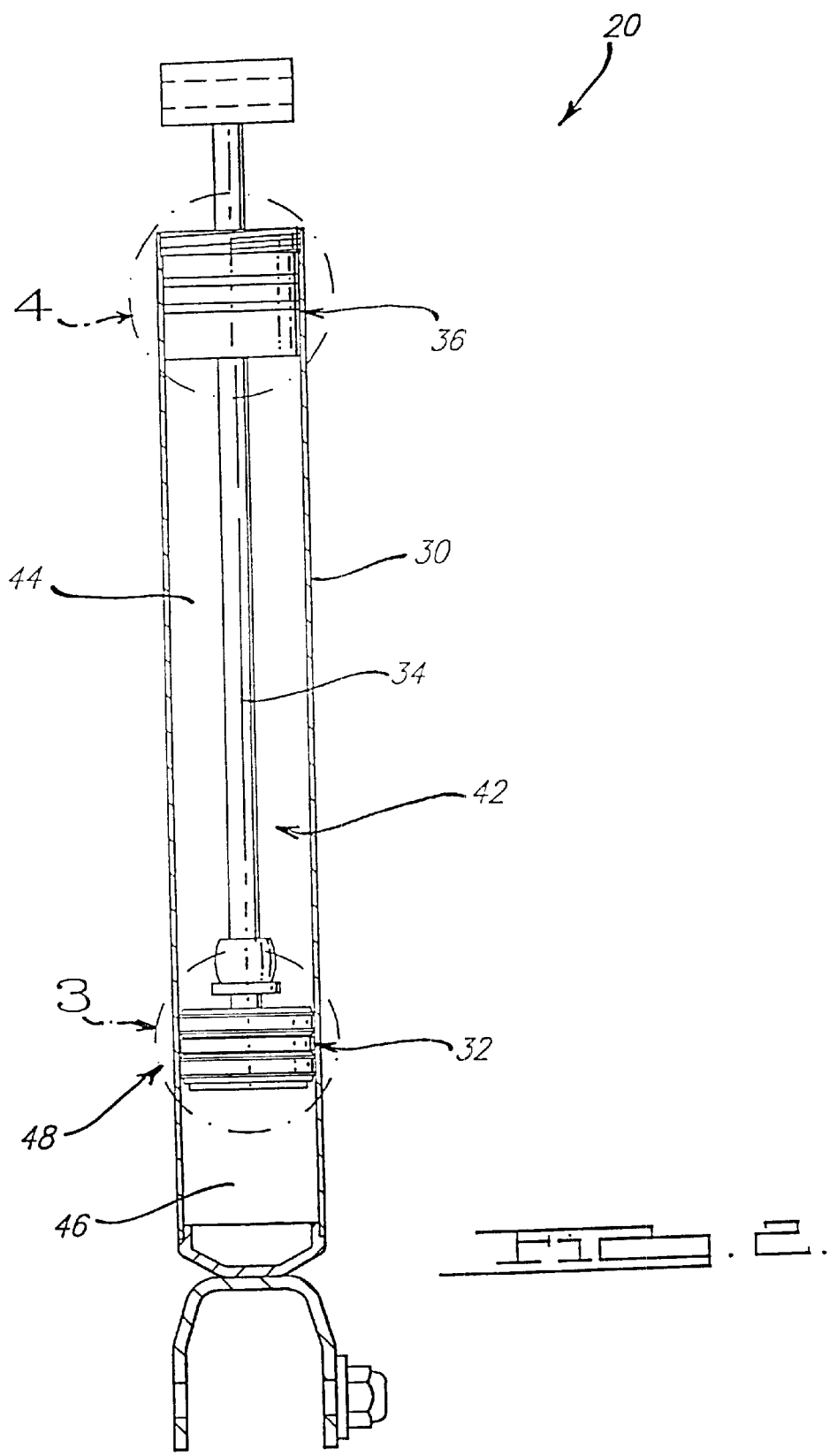
FIG. 2 is a side view, partially in cross-section, of the unique gas filled frequency dependant damper in accordance with the present invention.

Referring to FIG. 2, rear shock absorber 20 is shown in greater detail. While FIG. 2 shows only rear shock absorber 20, it is to be understood that front shock absorber 26 could also be designed as a frequency dependant damper in accordance with the present invention. Front shock absorber 26 would only differ from rear shock absorber 20 in the way it is adapted to be connected to the sprung and unsprung portions of vehicle 10. Shock absorber 20 comprises a pressure tube 30, a piston assembly 32, a piston rod 34 and a rod guide assembly 36.

Pressure tube 30 defines a working chamber 42. Working chamber 42 is filled with a gas, preferably air, at a specified pressure to act as the damping medium. Piston assembly 32 is slidably disposed within working chamber 42 and divides working chamber 42 into an upper working chamber 44 and a lower working chamber 46. A seal assembly 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through rod guide assembly 36 which closes the upper end of pressure tube 30. The end of piston rod 34 opposite to piston assembly 32 is adapted to be secured to the sprung portion of vehicle 10. The end of pressure tube 30 opposite to rod guide assembly 36 is adapted to be connected to the unsprung portion of vehicle 10. While piston rod 34 is shown adapted for being connected to the sprung portion of vehicle 10 and pressure tube 30 is adapted for being connected to the unsprung portion of vehicle 10, due to the use of a gas as the pressure medium, it is within the scope of the present invention to have piston rod 34 adapted to attach to the unsprung portion of vehicle 10 and pressure tube 30 adapted to attach to the sprung portion of vehicle 10 if desired.

Figure 3:
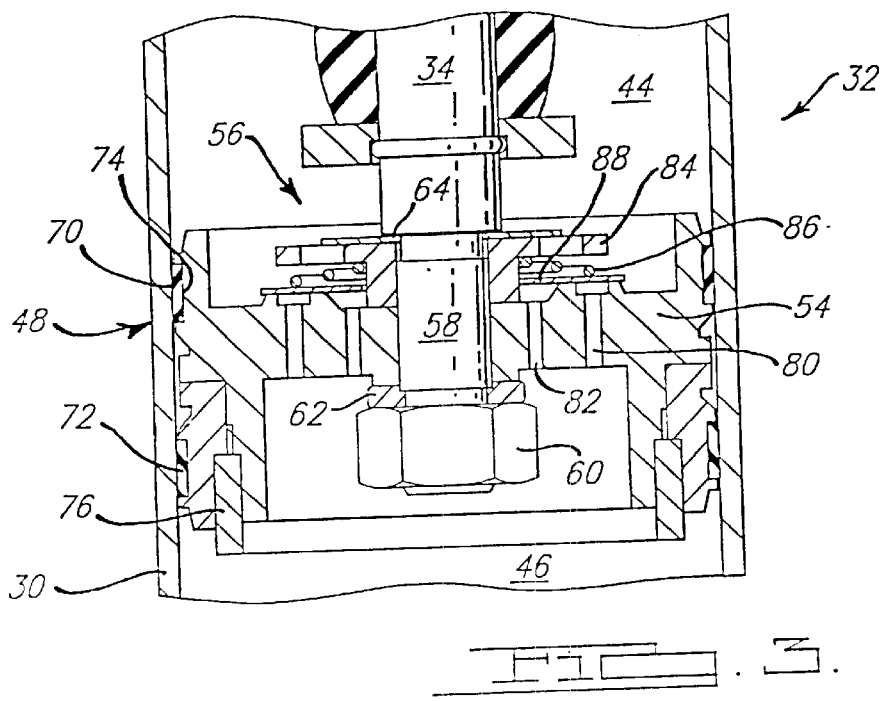
FIG. 3 is an enlarged cross-sectional view of the valving system incorporated into the frequency dependant damper shown in circle 3 in FIG. 2.

Referring now to FIGS. 2 and 3, piston assembly 32 comprises a piston body 54 and a compression valve assembly 56. Piston rod 34 defines a reduced diameter section 58 onto which compression valve assembly 56 and piston body 54 are located. A nut 60 and a washer 62 secure piston assembly 32 onto section 58 of piston rod 34 with compression valve assembly 56 abutting a shoulder 64 located on piston rod 34, piston body 54 abutting compression valve assembly 56 and washer 62 with nut 60 abutting piston body 54.

Seal assembly 48 comprises a first annular seal 70 located between piston body 54 and pressure tube 30 at a position adjacent upper working chamber 44 and a second annular seal 72 located between piston body 54 and pressure tube 30 at a position adjacent lower working chamber 46. Annular seal 70 is held in position by a plurality of grooves 74 formed in piston body 54 and operates to seal upper working chamber 44 during an extension of shock absorber 20. Annular seal 72 is held in position by a retainer 76 which is attached to both annular seal 72 and piston body 54 and operates to seal lower working chamber 46 during a compression move of shock absorber 20. While seal assembly 48 is being illustrated as a multi-piece component, it is within the scope of the present invention to manufacture annular seals 70 and 72 as a single piece component if desired. Seal assembly 48 permits sliding movement of piston body 54 with respect to pressure tube 30 without generating undue frictional forces as well as providing the seal between upper working chamber 44 and lower working chamber 46. This dual role played by seal assembly 48 is extremely important for the pneumatic shock absorber due to the higher pressures generated in working chambers 44 and 46 with the continued need for limiting the sliding forces generated between piston assembly 32 and pressure tube 30.

Piston body 54 defines a plurality of compression passages 80 and a plurality of extension passages 82. During an extension movement of shock absorber 20, gas flows between upper working chamber 44 and lower working chamber 46 through passages 82 as described below. During a compression movement of shock absorber 20, gas flows between lower working chamber 46 and upper working chamber 44 through passages 80 and 82 as described below.

Compression valve assembly 56 comprises a stop 84, a valve spring 86 and a valve plate 88. Valve plate 88 is biased against piston body 54 by valve spring 86 which reacts against stop 84 to normally close the plurality of compression passages 80. During a compression stroke of shock absorber 20, the gas in lower working chamber 46 is compressed including the gas within the plurality of compression passages 80. The plurality of extension passages 82 are always open and thus will allow a limited flow of the gas between lower working chamber 46 and upper working chamber 44 as the gas in lower working chamber 46 is compressed. The compressed gas in compression passages 80 exerts a force on valve plate 88 which will remain seated closing passages 80 until the force created by the gas pressure overcomes the biasing load of valve spring 86 unseating valve plate 88 from piston body 54 allowing additional gas to flow from lower working chamber 46 to upper working chamber 44 through passages 80. Thus, a two step damping force is created during a compression stroke. The initial movement and/or small movements of piston assembly 32 will cause the gas to flow only through extension passages 82. When the movement exceeds a predetermined speed or value and/or during large movements of piston assembly 32, compression valve assembly 56 will open allowing gas flow through both passages 80 and 82. The two step damping force switches from a relatively firm damping to a relatively soft damping.

During an extension stroke of shock absorber 20, compression valve assembly 56 will remain closed prohibiting gas flow through compression passages 80. All gas flow during an extension stroke will be through extension passages 82 and the size of passages 82 will determine the damping characteristics of shock absorber 20.

Figure 4:
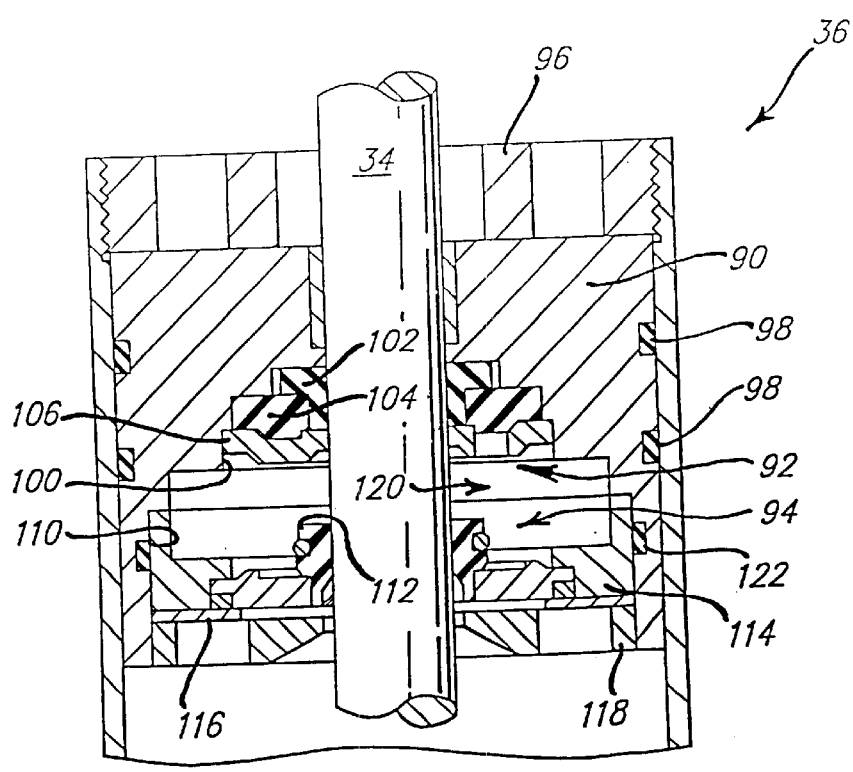
FIG. 4 is an enlarged cross-sectional view of the rod guide assembly shown in circle 4 in FIG. 2.

Referring now to FIGS. 2 and 4, rod guide assembly 36 provides both a sealing function for shock absorber 20 as well as a lubricating function. Rod guide assembly 36 comprises a main housing 90, an upper seal assembly 92, a lower seal assembly 94 and a retainer 96. Main housing 90 is fit within pressure tube 30 with a pair of seals 98 sealing the interface between housing 90 and pressure tube 30. Retainer 96 secures main housing 90 within pressure tube 30. Housing 90 defines a first cavity 100 within which is located upper seal assembly 92.

Upper seal assembly 92 comprises a dynamic seal 102 located between housing 90 and piston rod 34, a static seal 104 located between first seal 102 and housing 90 and a retainer 106 attached to housing 90 to retain upper seal assembly 92 within cavity 100.

Housing 90 defines a second cavity 110 within which is located lower assembly 94. Lower assembly 94 comprises a seal 112 located adjacent to piston rod 34, a seal housing 114, a spacer 116 and a retainer 118 secured to housing 90 to retain lower assembly 94 within second cavity 110. Seal housing 114 is positioned within housing 90 with a seal 122 sealing the interface. Seal 112 is located between piston rod 34 and seal housing 114. Spacer 116 is positioned adjacent to both seal housing 114 and seal 112 to protect seal 112 during the installation of retainer 118 as well as providing for a specified amount of compression between seal 112 and housing 114.

Housing 90, upper seal assembly 92 and lower assembly 94 co-operate to form a chamber 120 which is filled within lubricating oil to seal and lubricate the movement of piston rod 34 through rod guide assembly 36. Seal 122 located between housing 90 and seal housing 114 isolates chamber 120 from upper working chamber 44. During assembly of shock absorber 10, chamber 120 is filled with a specified amount of lubricant. Upper seal assembly 92 isolates chamber 120 from the outside environment and lower assembly 94 isolates chamber 120 from upper working chamber 44. Thus, the lubricant within chamber 120 of shock absorber 20 seals working chamber 42 to allow it to maintain its original gas charge while simultaneously providing lubrication for the movement of piston rod 34.

Figure 5:
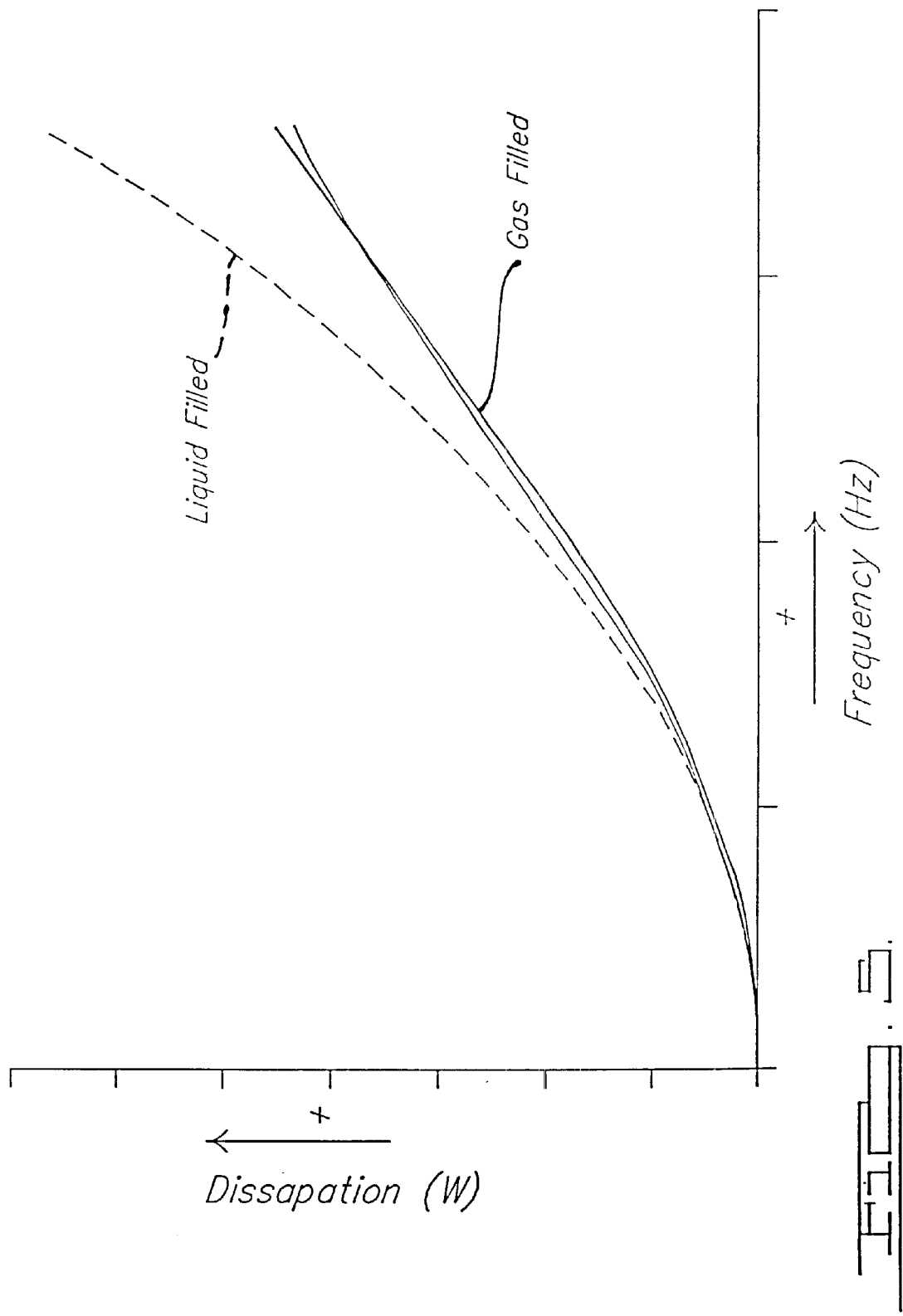
FIG. 5 is a graph showing frequency versus dissipation for both a liquid filled prior art shock absorber and the gas filled shock absorber according to the present invention.
Figure 5:
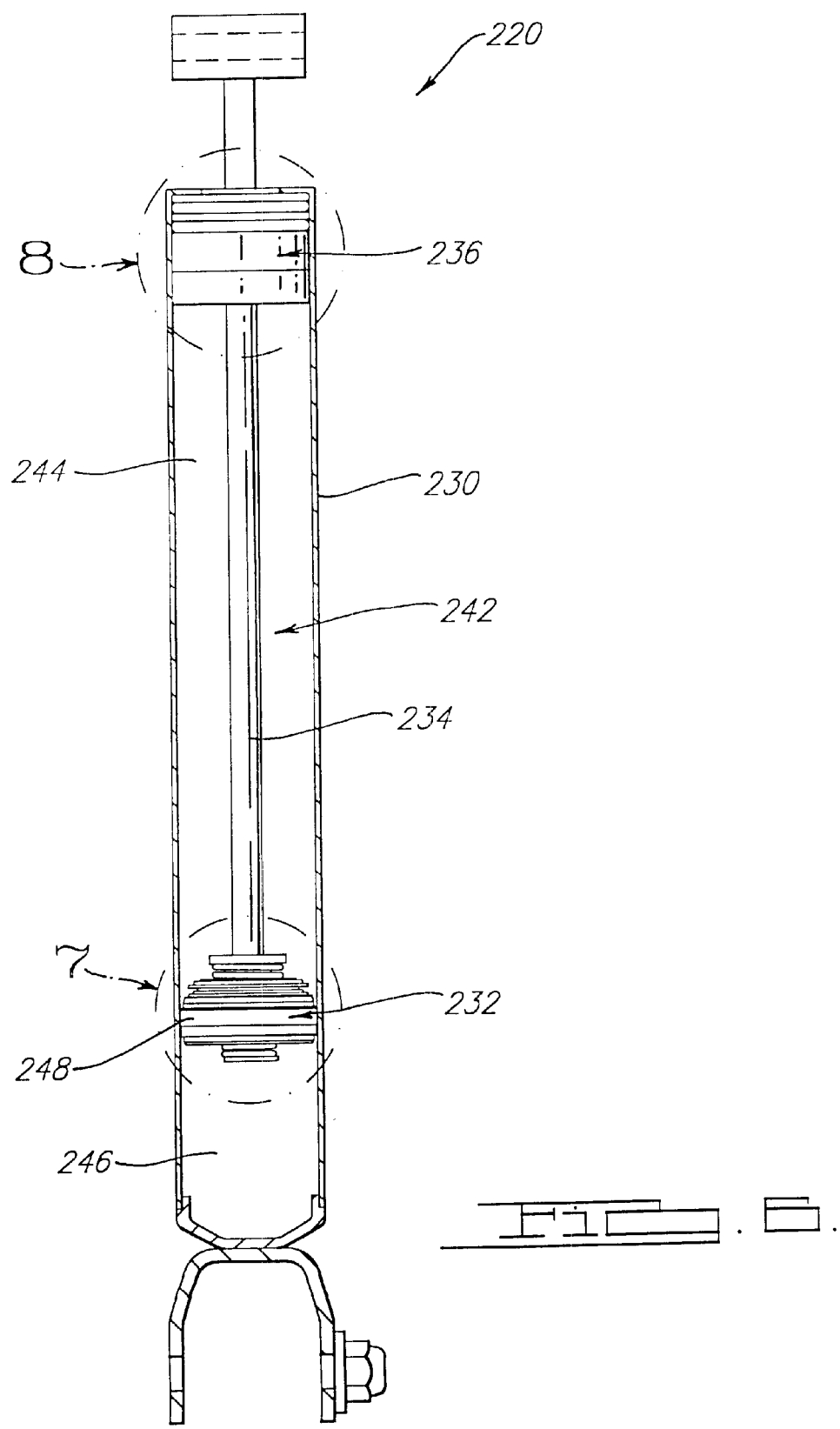

Gas filled shock absorber 20 described above provides a frequency dependant damper which can be tuned to specific performance requirements for specific applications. During compression and extension movements of a prior art liquid filled shock absorber, the liquid moves from either the lower working chamber to the upper working chamber or the upper working chamber to the lower working chamber. This provides frequency vs. dissipation response curves which continue to rise at an ever increasing rate as the frequency of the damped vibration increases leading to an exponential shape curve at higher frequencies. The present invention provides the suspension system designer the opportunity to flatten the shape of this curve as shown in FIG. 5.

The flattening out of this curve is due to the compressibility of a gas versus the non-compressibility of a liquid. During low speed or low frequency movements of shock absorber 20, minimal compression of the gas occurs and movement of piston assembly 32 transfers gas between lower and upper working chambers 44, 46 of pressure tube 30. As the frequency of the movement increases, compression of the gas will also increase changing the dissipation as the compressed gas begins to work like a gas spring. The specific point at which the gas shock curve bends away from the liquid shock curve can be tuned by selecting different sizes for passages 80 and 82. In addition to changing the shape of the curve as shown in FIG. 5, the height of the curve can be tuned by changing the initial pressure within working chamber 42.

The dual points of tunability for shock absorber 20 allows for tuning shock absorber 20 to both the body natural frequency and the wheel suspension natural frequency to optimize performance of shock absorber 20 at both of these frequencies. The prior art liquid shock absorbers could be tuned to a specific frequency response but the remaining frequency responses were a result of the shape of the curve which could not be altered.

Referring now to FIG. 6, a shock absorber 220 in accordance with another embodiment of the present invention is illustrated. While FIG. 6 illustrates only shock absorber 220; it is to be understood that either of shock absorbers 20 or 26 could also be designed as a frequency dependent damper in accordance with this embodiment of the present invention. Shock absorbers 20 or 26 would only differ from shock absorber 220 in the way it is adapted to be connected to the sprung and unsprung portions of vehicle 10 and in the dimensions of the various components. Shock absorber 220 comprises a pressure tube 230, a piston assembly 232, a piston rod 234 and a rod guide assembly 236.

Pressure tube 230 defines a working chamber 242. Working chamber 242 is filled with gas, preferably air, at a specified pressure to act as the damping medium. Piston assembly 232 is slidably disposed within working chamber 242 and it divides working chamber 242 into an upper working chamber 244 and a lower working chamber 246. A seal 248 is disposed between piston assembly 232 and pressure tube 230 to permit sliding movement of piston assembly 232 with respect to pressure tube 230 without generating undue frictional forces as well as sealing upper working chamber 244 from lower working chamber 246. Piston rod 234 is attached to piston assembly 232 and extends through upper working chamber 244 and through rod guide assembly 236 which closes the upper end of pressure tube 230. The end of piston rod 234 opposite to piston assembly 232 is adapted to be secured to the sprung portion of vehicle 10. The end of pressure tube 230 opposite to rod guide assembly 236 is adapted to be connected to the unsprung portion of vehicle 10. While piston rod 234 is shown adapted for being connected to the sprung portion vehicle 10 and pressure tube 230 is adapted for being connected to the unsprung portion of vehicle 10, due to the use of a gas as the damping medium, it is within the scope of the present invention to have piston rod 234 adapted to attach the unsprung portion of vehicle 10 and pressure tube 230 adapted to attach to the sprung portion of vehicle 10, if desired.

Figure 7:
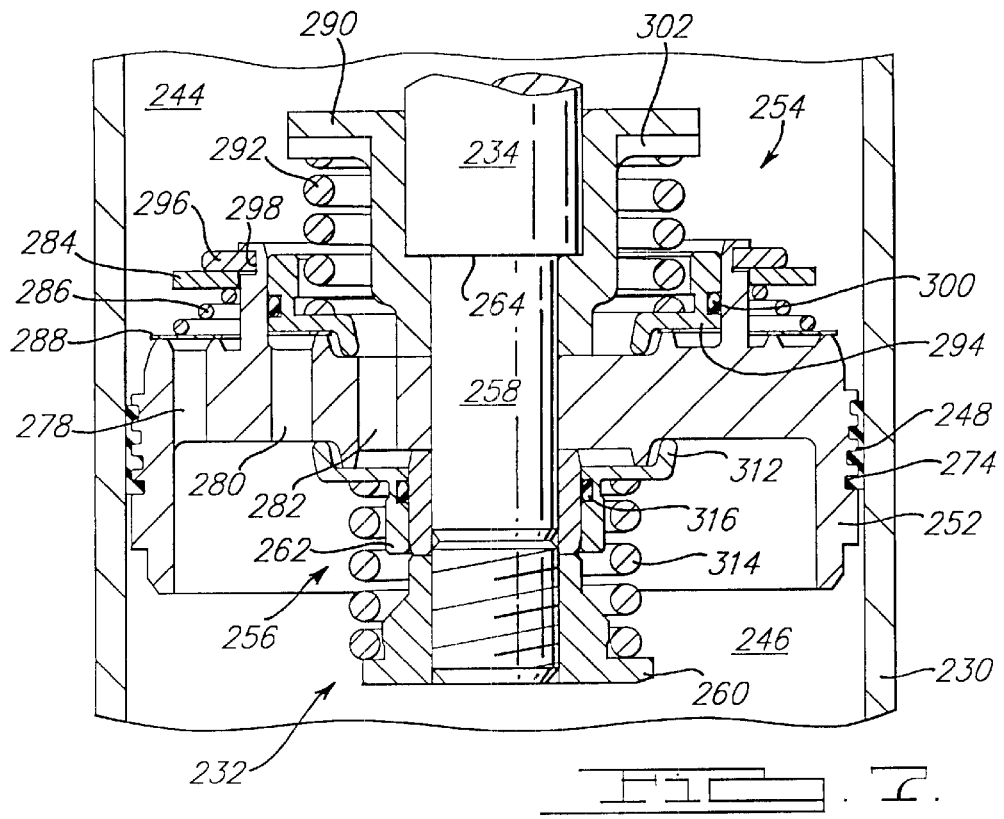
FIG. 7 is an enlarged cross-sectional view of the piston valving system incorporated into the frequency dependent damper shown in FIG. 6.

Referring now to FIGS. 6 and 7, piston assembly 232 comprises a piston body 252, a compression valve assembly 254 and a rebound or extension valve assembly 256. Piston rod 234 defines a reduced diameter section 258 onto which compression valve assembly 254, piston body 252 and rebound valve assembly 256 are located. A nut 260 and a spacer 262 secure piston assembly 232 onto section 258 of piston rod 234 with compression valve assembly 254 abutting a shoulder 264 located on piston rod 234, piston body 252 abutting compression valve assembly 254, spacer 262 with nut 260 abutting piston body 252 and rebound valve assembly 256 being disposed between piston body 252 and nut 260.

Seal 248 is an annular seal located between piston body 252 and pressure tube 230. Seal 248 is held in position by a plurality of grooves 274 formed in piston body 252. Seal 248 permits sliding movement of piston body 252 with respect to pressure tube 230 without generating undue frictional forces as well as providing the seal between upper working chamber 244 and lower working chamber 246. This dual role played by seal 248 is extremely important for pressurized gas shock absorber 220 due to the high pressures generated in working chambers 244 and 246 and the continued need for limiting the sliding forces generated between piston assembly 232 and pressure tube 230.

Piston body 252 defines a first plurality of compression passages 278, a second plurality of compression passages 280 and a plurality of extension passages 282. During a compression movement of shock absorber 220, gas flows between lower working chamber 246 and upper working chamber 244 through passages 278 and passages 280. During an extension movement of shock absorber 220, gas flows between upper working chamber 244 and lower working chamber 246 through passages 282 as described below.

Compression valve assembly 254 comprises a first support washer 284, a first valve spring 286, a first valve plate 288, a second support washer 290, a second valve spring 292 and a second valve plate 294. First valve plate 288 is biased against piston body 252 by first valve spring 286 which reacts against first support washer 284 to normally close the first plurality of compression passages 278. First support washer 284 is supported by a retaining ring 296 which is positioned within a groove 298 formed in piston body 252. Second valve plate 294 is biased against piston body 252 by second valve spring 292 which acts against second support washer 290 to normally close the second plurality of compression passages 280. Second support washer 290 is supported by shoulder 264 on piston rod 234. During a compression stroke of shock absorber 226, the gas in lower working chamber 246 is compressed including the gas within the first plurality of compression passages 278 and the second plurality of compression passages 280. Extension valve assembly 256 will remain closed to prohibit fluid flow through the plurality of extension passages 282. The compressed gas in compression passages 278 exerts a force on first valve plate 288 and the compressed gas in compression passages 280 exerts a force on second valve plate 294. Valve plates 288 and 294 will remain seated closing passages 278 and 280, respectively until the force created by the gas pressure overcomes the biasing of valve springs 286 and 292, respectively. First valve spring 286 is designed to exert a lower force on first valve plate 288 than the force exerted on second valve plate 294 by second valve spring 292. Thus, first valve plate 288 will unseat from piston body 252 prior to the unseating of second valve plate 294 to allow gas flow from lower working chamber 246 to upper working chamber 244 through passages 278. This initial flow of gas through the first plurality of compression passages 278 provides for a soft ride during small compression movements of shock absorber 220. When the compression stroke continues after the opening of passages 278, the fluid pressure within the second plurality of compression passages 280 will overcome the biasing load of second valve spring 292 unseating second valve plate 294 from piston body 252 allowing additional gas flow from lower working chamber 246 to upper working chamber 244 through passages 280. In order to ensure the proper build up of pressure within passages 280, a seal 300 is located between second valve plate 294 and a smooth surface on piston body 252. Also, to ensure the proper flow of gas through passages 280, second support washer 290 is provided with a plurality of radial slots 302 which allow the gas to flow into upper working chamber 244 unrestricted by second valve spring 292. Thus, a two step damping force is created during a compression stroke. The initial movement and/or relatively small movements of piston assembly 232 will cause the gas to flow only through the first plurality of compression passages 278. When the movement exceeds a predetermined speed or valve and/or during relatively large movements of piston assembly 232, gas will flow through both the first plurality of compression passages 278 and the second plurality of passages 280.

Extension valve assembly 256 comprises a sliding valve plate 312 and a valve spring 314. Valve plate 312 is biased against piston body 252 by valve spring 314 which reacts against retaining nut 260. During an extension stroke of shock absorber 220, the gas in upper working chamber 246 is compressed including the gas within the plurality of extension passages 282. The compressed gas in extension passages 282 exerts a force of valve plate 312 which will remain seated closing passages 282 until the force created by the gas pressure overcomes the biasing load of valve spring 314 unseating valve plate 312 from piston body 252 by sliding valve plate 312 down along spacer 262 allowing gas to flow from upper working chamber 244 to lower working chamber 246 through passages 282. In order to ensure the proper build up of pressure within passages 282, a seal 316 is located between valve plate 312 and a smooth surface on spacer 262.

Figure 8:
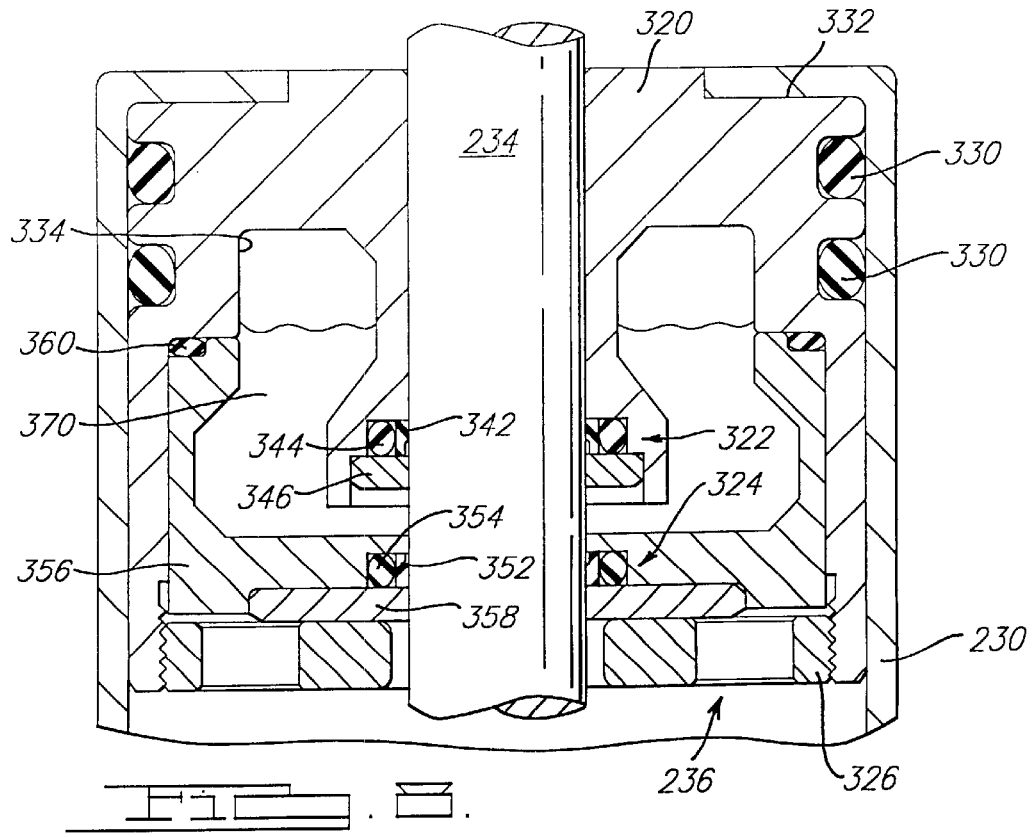
FIG. 8 is an enlarged cross-sectional view of the rod guide assembly shown in FIG. 6.

Referring now to FIGS. 6 and 8, rod guide assembly 236 provides both a sealing function for shock absorber 220 as well as a lubricating function. Rod guide assembly 236 comprises a main housing 320, an upper seal assembly 322, a lower seal assembly 324 and a retainer 326. Main housing 320 is fit within pressure tube 230 with a pair of seals 330 sealing the interface between housing 320 and pressure tube 230. Pressure tube 230 is formed into a groove 332 defined by main housing 320 to secure main housing 320 within pressure tube 230. Housing 320 defines an internal cavity 334 which is partially filled with oil as shown in FIG. 8. The level of oil within cavity 334 is designed to keep upper seal assembly 322 and lower seal assembly 324 submerged in oil.

Upper seal assembly 322 comprises a sliding seal 342 located on piston rod 234, a static seal 344 located between sliding seal 342 and housing 320 and a retainer 346 which is secured to housing 320 to retain upper seal assembly 322 within cavity 334.

Lower seal assembly 324 is similar to upper seal assembly 322 and it comprises a sliding seal 352, a static seal 354, a seal housing 356 and a retainer 358. Sliding seal 352 is located on piston rod 234 and static seal 354 is located between sliding seal 354 and seal housing 356. Retainer 358 is secured to seal housing 356 to retain seals 352 and 354 within housing 356. Seal housing 356 is located within cavity 334 defined by main housing 320. A seal 360 seals the interface between main housing 320 and seal housing 356. Retainer 326 is secured to main housing 320 to retain lower seal assembly 324 within cavity 334.

Main housing 320, upper seal assembly 322 and lower seal assembly 324 form a chamber 370 within cavity 334 which is filled with lubricating oil to seal and lubricate the movement of piston rod 234 through rod guide assembly 236. During assembly of shock absorber 220, chamber 370 is filled with a specified amount of lubricant. Upper seal assembly 322 isolates chamber 370 from the outside environment and lower seal assembly 324 along with seal 360 isolates chamber 370 from upper working chamber 244. Thus, the lubricant within chamber 370 of shock absorber 220 seal working chamber 242 to allow it to maintain its original gas charge while simultaneously providing lubrication for the movement of piston rod 234.

Gas filled shock absorber 220 described above provides a frequency dependent damper which can be tuned to specific performance requirements for specific applications. During compression and extension movements of a prior art liquid filled shock absorber, the liquid moves from either the lower working chamber to the upper working chamber or the upper working chamber to the lower working chamber. This provides frequency versus dissipation response curves which continue to rise at an ever increasing rate as the frequency of the damped vibration increases. This leads to an exponentially shaped curve at the higher frequencies. The present invention provides the suspension system designer the opportunity to flatten the shape of this curve as shown in FIG. 5.

The flattening out of this curve is due to the compressibility of a gas versus the non-compressibility of a liquid. During low speed or low frequency movements of shock absorber 220, minimal compression of the gas occurs and movement of piston assembly 232 transfers gas between lower and upper working chambers 244, 246 of pressure tube 230. As the frequency of the movement increases, compression of the gas will also increase, changing the dissipation as the compressed gas begins to work like a gas spring. The specific point at which the gas shock curve bends away from the liquid shock curve can be tuned by selecting different sizes for passages 278, 280 and 282. In addition to changing the shape of the curve as shown in FIG. 5, the height of the curve can be tuned by changing the initial pressure within working chamber 242.

The dual points of tunability for shock absorber 220 allows for tuning shock absorber 220 to both the body natural frequency and the wheel suspension natural frequency to optimize performance of shock absorber 220 at both of these frequencies. The prior art liquid shock absorbers could be tuned to a specific frequency response but the remaining frequency responses were a result of the shape of the curve which could not be changed.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube forming a working chamber;
   a piston disposed within said working chamber, said piston dividing said working chamber into an upper working chamber and a lower working chamber, said piston including:
   a piston body;
   a first plurality of obstruction free compression passages extending entirely through said piston body;
   a second plurality of obstruction free compression passages extending entirely through said piston body;
   a plurality of extension passages extending through said piston body;
   a first compression check valve disposed adjacent said piston body, said first compression check valve closing said first compression passages, said first compression check valve being the only means for closing said first compression passages; and
   a second compression check valve disposed adjacent said piston body, said second compression check valve closing said second compression passages, said second compression check valve being the only means for closing said second compression passages.

2. The damper according to claim 1 further comprising an extension check valve disposed adjacent said piston body, said extension check valve closing said extension passages.

3. The damper according to claim 1 wherein, said working chambers are filled with a gas.

4. The damper according to claim 3 wherein, said gas is air.

5. The damper according to claim 1 further comprising:
   a piston rod secured to said piston and extending through said pressure tube; and
   a rod guide assembly disposed between said piston rod and said pressure tube.

6. The damper according to claim 5 wherein, said rod guide assembly defines a fluid chamber, said fluid chamber being filled with a lubricating fluid.

7. The damper according to claim 6 wherein, said working chambers are filled with a gas.

8. The damper according to claim 7 wherein, said gas is air.

9. A damper comprising:
   a pressure tube forming a working chamber;
   a piston disposed within said working chamber, said piston dividing said working chamber into an upper working chamber and a lower working chamber, said piston including:
   a piston body;
   a first plurality of compression passages extending through said piston body;
   a second plurality of compression passages extending through said piston body;
   a plurality of extension passages extending through said piston body;
   a first compression check valve disposed adjacent said piston body, said first compression check valve closing said first compression passages, said first compression check valve being the only means for closing said first compression passages; and
   a second compression check valve disposed adjacent said piston body, said second compression check valve closing said second compression passages, said second compression check valve being the only means for closing said second compression passages.

10. A damper comprising:
    a pressure tube forming a working chamber;
    a piston disposed within said working chamber, said piston dividing said working chamber into an upper working chamber and a lower working chamber, said piston including:
    a piston body;
    a first plurality of continuously open compression passages extending through said piston body;
    a second plurality of continuously open compression passages extending through said piston body;
    a plurality of extension passages extending through said piston body;
    a first compression check valve disposed adjacent said piston body, said first compression check valve closing said first compression passages, said first compression check valve being the only means for closing said first compression passages; and
    a second compression check valve disposed adjacent said piston body, said second compression check valve closing said second compression passages, said second compression check valve being the only means for closing said second compression passages.

* * * * *